Patented Aug. 14, 1934

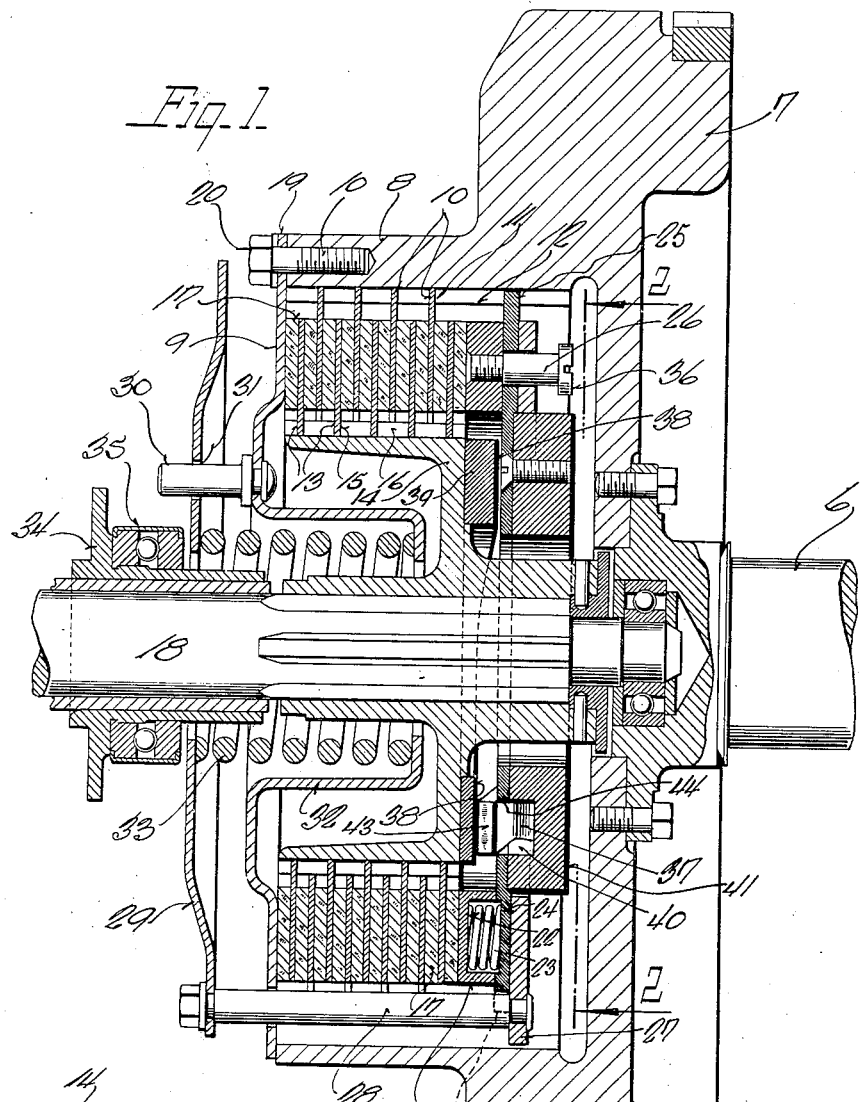

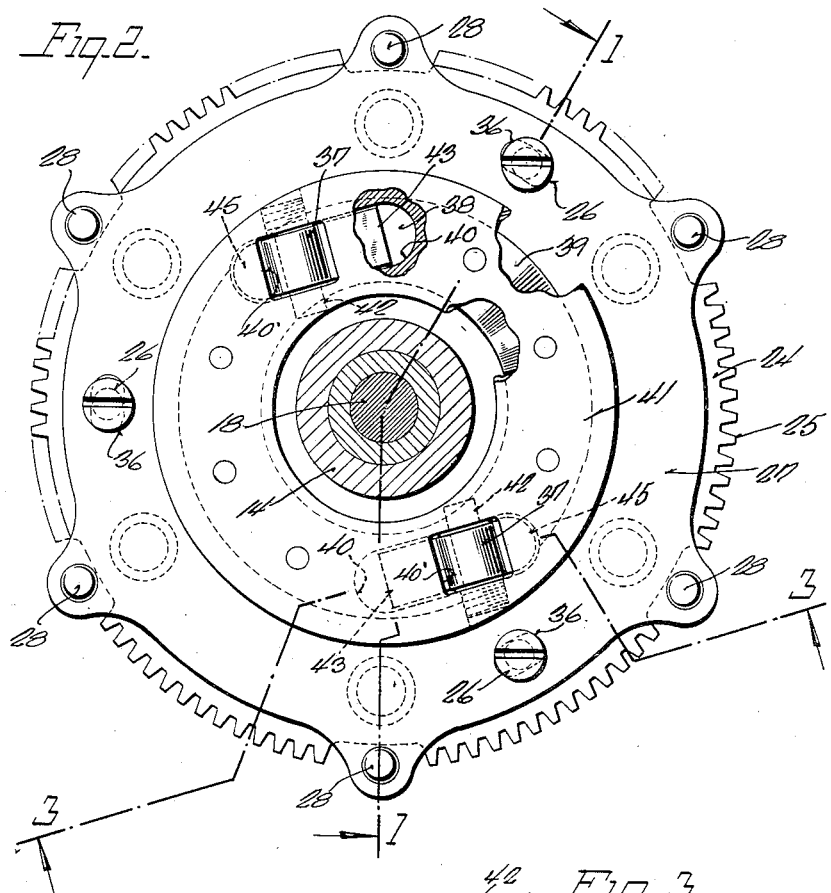
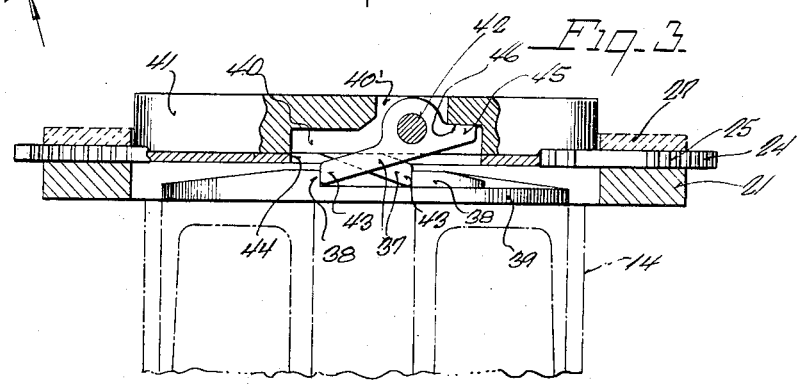

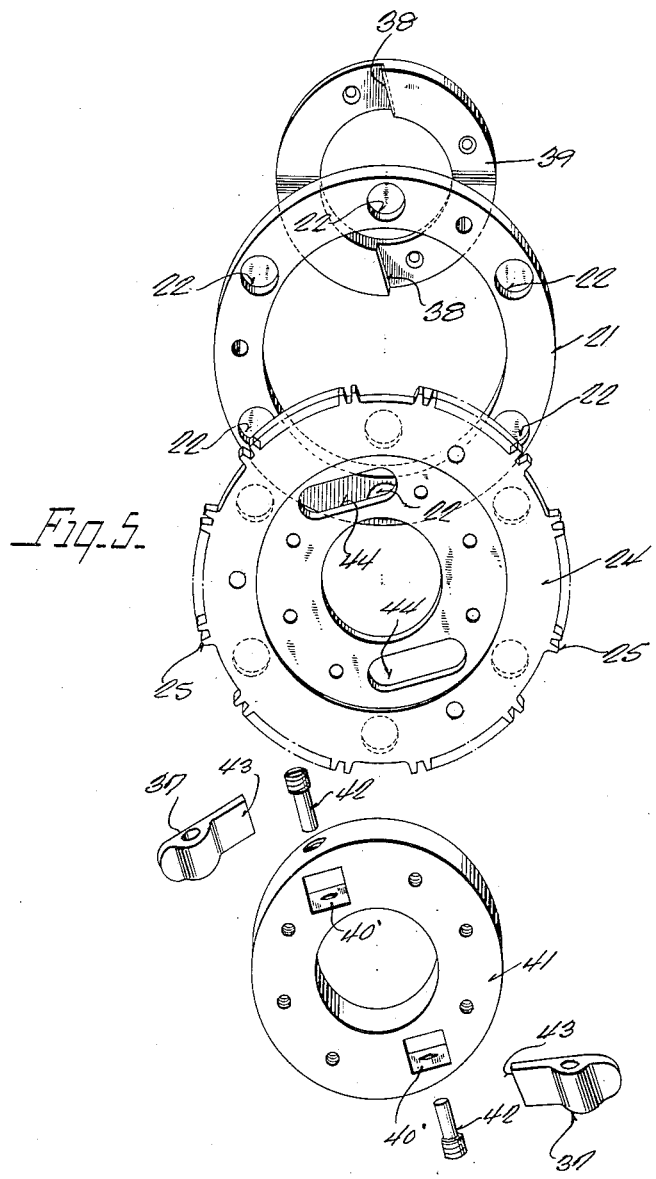

1,969,993

UNITED STATES PATENT OFFICE 1,969,993

CLUTCH

Hugo F. Schmidt, Milwaukee, Wis.

Application April 6, 1931, Serial No. 527,993

9 Claims. (Cl. 192—53)

This invention relates to certain new and useful improvements in clutches, and has as one of its objects to provide means for automatically establishing a positive drive connection between the driving and driven elements of a friction clutch after said elements are frictionally engaged.

Another object of this invention is to provide means whereby the positive drive connection is released before the frictional engagement of the clutch elements is in any way disturbed.

And a further object of this invention resides in the provision of means whereby centrifugal force actuates means carried by one of the cooperating elements of a friction clutch for automatic engagement with means carried by the other element to establish a positive driving connection between the clutch elements.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof; and in which:

Figure 1 is a longitudinal section taken through a typical multi-disc friction clutch on the line 1—1 of Figure 2, illustrating the manner in which my invention is applied thereto;

Figure 2 is a cross section view taken through Figure 1 on the plane of the line 2—2;

Figure 3 is a section view taken through Figure 2 on the plane of the line 3—3;

Figure 4 is a fragmentary detail view illustrating part of the clutch mechanism in longitudinal section and showing the elements in their de-clutched or disengaged relationship; and Figure 5 is a perspective view of the elements entering into the structure by which the positive drive connection is obtained, removed from the clutch proper and shown separated and in their proper order of assembly.

Referring now more particularly to the accompanying drawings, in which like numerals designate like parts, the numeral 6 represents part of a conventional combustion engine crank shaft having a fly-wheel 7 secured thereto from which an annular flange 8 projects to define a cylindrical well to house a clutch mechanism indicated by the numeral 9.

The clutch mechanism illustrated is of the multiple disc type, in which a plurality of discs 10, non-rotatably connected with the fly-wheel 7 by a series of interengaging teeth 11 and 12 on the outer peripheries of the discs and the inner wall of the annular flange 8, respectively, are adapted for frictional driving engagement with a second series of discs 13 in alternating relation with the discs 10 and non-rotatably connected with a spider 14 by interengaging teeth 15 and 16 carried by the discs 13 and the spider, respectively.

Clutch facings 17 of suitable material are secured to one series of discs whereby compression of the discs frictionally connects the same and imparts motion from the fly-wheel to the spider 14. The spider is in turn splined to a driven shaft 18. The driving element of the clutch thus comprises the shaft 6 and fly-wheel 7 and the series of discs 10, and the driven element consists of the discs 13, the spider 14, and the shaft 18.

The series of alternately stacked discs 10 and 13 rest at one side on a plate 19 secured to the annular flange 8 by cap screws 20. At the other side of the series of discs is a ring 21 which forms part of the means for positively drivingly connecting the driving and driven elements, as will be later described.

The disc nearest the ring 21 is one of the series carried by the spider 14 and a facing 17 is positioned between said disc and the ring 21. The ring 21 is substantially rectangular in cross section and has a plurality of pockets 22 at equi-spaced points in its circumference to receive compression springs 23.

The springs 23 are confined between the bottoms of the pockets and the adjacent side of a plate 24 which is larger in diameter than the ring 21 and has its outer periphery provided with teeth 25 similar to the teeth 11 on the discs 10, to engage the teeth 12 on the inner wall of the fly-wheel carried annular flange 8. The plate is thus non-rotatably connected with the fly-wheel and turns with it, and the ring 21 is non-rotatably connected with the plate 24 by a series of studs 26 secured to the ring.

The side of the plate 24 opposite the ring 21, rests against a front clutch release plate 27 which, through a series of studs 28, is connected with a rear clutch release plate 29. The rear clutch release plate 29 is held against rotational movement with respect to the plate 19 by a number of studs 30 carried by the plate 19 and slidably received in openings 31 in the plate 29.

Confined between the release plate 29 and the bottom of a substantially cup-shaped well 32 formed by depressing the central portion of the plate 19, is a main clutch spring 33 which maintains the discs under compression through the plate 29, the studs 28, the plate 27, and the ring 21 and plate 24, the spring 33 being slightly stronger than the combined strength of the springs 23 so that the plate 24 is directly engaged with the ring 21.

To disengage the clutch, the plate 29 is moved forwardly by means of a conventional release yoke (not shown) engaging a collar 34 sliding on the shaft 18 and spaced from the plate 29 by a ball bearing 35. The forward movement of the plate 29 is of course, transmitted to the plate 27 and as the main spring 33 is compressed during this movement, the springs 23 expand with the movement of the plate 27 and cause the plate 24 to move away from the ring 21. The springs 23, however, maintain the discs in a state of compression sufficient to retain their frictional engagement until the ring 21 and plate 24 have separated a predetermined distance. The separation of the plate 24 from the ring 21 is limited by the engagement of heads 36 on the studs 26, with the adjacent face of the plate 27.

The retention of the frictional driving connection between the clutch elements, for a definite period during the disengagement of the clutch effects a degree of lost motion on the part of the actuating means both during disengagement and engagement of the clutch; and this degree of lost motion is utilized to permit the clutch to be frictionally engaged prior to the engagement of the positive connecting means, now about to be described, and permits the positive driving connection to be released prior to the release of the clutch elements from frictional connection.

The positive driving connection is obtained by the engagement of two or more pawls 37 carried by and movable with the driving element of the clutch, with cooperating ratchet teeth 38 fixed to the spider 14 of the driven element. The ratchet teeth 38 may be formed integral with the spider 14 or, as in the present instance, may be formed on a separate ring-like element 39 which is bolted or otherwise fixed to the spider.

The pawls 37 are received in recesses or pockets 40 in a bracket ring 41 secured to the plate 24 by screws or the like. The pockets 40, as best shown in Figure 3, extend substantially half way into the ring 41 which is substantially rectangular in cross section and at medial points the pockets are continued through the ring 41 to provide openings 40'. The base or mounting portion of the pawls is disposed at the openings 40' and pivot pins 42 pass through aligned bores in the bracket ring and the base portions of the pawls to pivotally mount the pawls with their major portions disposed in the pockets 40.

The axis of the pins 42, while in a plane perpendicular to the longitudinal axis of the clutch which of course coincides with the axes of the shafts 6 and 18, are not radial to said longitudinal axis, but are off-center; and the weight of the pawls is so distributed that their ratchet engaging ends are nearer the longitudinal axis of the clutch than any other portion thereof and their centers of gravity lie at that side of the perpendicular plane in which the pin axes are located, at which the ratchet engaging ends 43 are positioned.

It is also apparent from the drawings, particularly Figures 2 and 3, that the center of gravity of the pawls not only lies closer to the longitudinal axis of the clutch than the supporting portions thereof, but also is positioned forwardly of their point of support with respect to the direction of rotation of the carrier plate and the clutch as a whole.

Consequently, during rotation of the clutch, the pawls tend to swing about the axes of their mounting pins to a position at which their centers of gravity are behind rather than forward of the pins. But the motion of the pawls produced in this manner is limited by the engagement of the tail pieces 45 with the adjacent portions 46 of the bottoms of the pockets 40 and at this limit of movement their noses or ratchet engaging ends 43 project outwardly of the pockets and through openings 44 in the plate 24 into engagement with the ring-like member carrying the ratchet teeth, providing the clutch elements are engaged and the plate 24 is in contact with the ring 21.

It is immaterial whether the pawls swing back to their retracted positions in which they are entirely within the pockets 40 as the carrier ring 41 is moved axially away from the ring 39 during disengagement of the clutch elements.

As hereinbefore brought out, the clutch elements are frictionally engaged for a definite period of movement of the releasing means with which the plate 24 and consequently the pawl carrying bracket ring moves, and the distance of movement during this period is substantially equal to or slightly greater than the depth of the ratchet teeth so that the positive connection is not made until a frictional drive connection is established and is completely released before the frictional connection is disturbed.

From the foregoing description taken in connection with the accompanying drawings, it will be readily apparent to those skilled in the art to which an invention of the character described appertains, that during the normal operation of the clutch when its cooperating elements are engaged, the pawls are at all times retained in their active positions by centrifugal force, so that upon the occurrence of any slippage in the frictional connection of the clutch elements the pawls will engage their cooperating ratchet teeth and thus provide a positive drive connection between the elements. The possible slippage between the elements is thus limited, and in the present instance in which two pawls and two cooperating ratchet teeth are provided, it is less than 180 degrees.

It is also apparent that by reason of the frictional engagement of the clutch elements prior to the establishment of the positive drive connection, the resilient action of the friction clutch is in no way disturbed and injury to the pawls or the ratchet teeth during disengagement is impossible, for whatever load remains on the clutch during disengagement is carried by the frictional connection of the elements until the pawls are moved from engagement with the ratchet teeth.

The structure by which the positive drive connection is afforded, is simple and capable of rugged design and obviously may be applied to any conventional friction clutch without in any way altering its mode of operation or changing its general structure, and while in this disclosure the positive connection transmits torque in but one direction, it is obvious that the provision of additional pawls and cooperating ratchet teeth arranged in opposite relation to those shown to transmit torque in the other direction, may be added without deviating from the spirit of the invention.

What I claim as my invention is:

1. In a clutch mechanism including cooperating elements adapted to be drivingly connected, separable members adapted upon engagement to establish a frictional drive connection between said elements, spring means for bringing the separable members into engagement and maintaining them engaged, means to oppose the action of the spring means and separate the members to release the said elements from said frictional connection, and means for positively connecting the cooperating elements, said means being brought into operative relationship by the spring means and being movable out of said operative relationship by the means for releasing the frictional connection.

2. In a clutch mechanism cooperating elements adapted to be drivingly connected, separable members adapted upon the engagement to establish a frictional drive connection between said elements, spring means for bringing the separable members into engagement and maintaining them engaged, a pawl carried by one of said elements, an abutment carried by the other of said elements, and engageable by the pawl to positively drivingly connect the elements, said pawl and abutment being brought into operative relationship by continued action of the spring means after the establishment of the frictional connection between said elements, and means for mounting the pawl upon its respective element whereby centrifugal force retains the same in its active position adapted for engagement with said abutment upon being brought into operative relationship therewith.

3. In a clutch mechanism including rotatable clutch elements, friction means for drivingly connecting said elements, spring means for normally maintaining said frictional connection, means operable in opposition to the spring means for releasing the elements from their frictional connection, a member movable axially with respect to the clutch elements by the spring means and the releasing means, means for positively drivingly connecting the clutch elements comprising a stop member connected with one of the clutch elements and a centrifugally actuated member carried by the other clutch element and engageable with the stop member, and means to cause one of said members cooperating to afford the positive connection to move axially with said axially movable member into and out of operative relationship with the other.

4. In a clutch mechanism, cooperating elements adapted to be drivingly connected, separable members adapted upon engagement to establish a frictional drive connection between said elements, means for affording a positive driving connection between the elements comprising, a pawl connected with one of the elements and an abutment connected with the other element, a pawl carrier movable axially to move the pawl into and out of operative relationship with the abutment, spring means tending to move the pawl carrier to a position holding the pawl out of operative relation with respect to the abutment, a second spring means of greater strength than the first spring means opposing and overcoming the first spring means to maintain the carrier in a position with the pawl in operative relationship to the abutment, and means for rendering the second spring means inoperative.

5. In a clutch mechanism, cooperating elements rotatable about a common axis and adapted to be drivingly connected, cooperating means carried by said elements for establishing a frictional drive connection therebetween, means for positively drivingly connecting the elements comprising, an abutment carried by one of the elements and a stop member associated with the other element and engageable with the abutment, a carrier for the stop member non-rotatably connected with the element with which the stop member is associated and movable axially to carry the stop member into and out of operative relationship with the abutment, spring means simultaneously tending to move said carrier to a position holding the stop member out of operative relationship with respect to the abutment and tending to maintain the cooperating means producing the frictional connection in engagement, a second spring means stronger than the first spring means and overcoming the same to hold said carrier in its position maintaining the stop member in operative relationship with respect to the abutment and maintaining the cooperating means producing the frictional driving connection between the elements in engagement, means for opposing said second spring means to free the first mentioned spring means for actuation whereupon the carrier together with the stop member is moved out of operative relationship to the abutment while the cooperating means producing the frictional drive connection are maintained in engagement, and means limiting the actuation of the first mentioned spring means after the positive connection is disrupted so that further actuation of the means acting in opposition to the second spring means disrupts the frictional drive connection.

6. In a clutch mechanism cooperating elements rotatable about a common axis, means for establishing a frictional drive connection between said elements, means for providing a positive driving connection between said elements comprising an abutment connected with one of the elements and a pawl associated with the other element and engageable with the abutment, a carrier for the pawl non-rotatably connected with the element with which the pawl is associated and movable axially to carry the pawl into and out of operative relationship with respect to the abutment, means mounting the pawl from the carrier so that centrifugal action maintains the same in an active position, spring means for maintaining the frictional drive connection between the elements and for moving the pawl carrier to a position at which the pawl is in operative relationship with respect to the abutment, means acting in opposition to said spring means for disrupting the frictional driving connection and for moving the pawl carrier to a position at which the pawl is out of operative relationship with respect to the abutment, and means for maintaining the frictional driving connection until the pawl is carried entirely out of operative relationship with respect to the abutment.

7. In a clutch mechanism, a pair of cooperating elements rotatable about a common axis and adapted to be drivingly connected, an axially shiftable plate substantially perpendicular to said common axis and non-rotatable with respect to one of the elements, a portion of said plate overlying part of the other cooperating element, a fixed abutment on said part, a centrifugally actuated pawl carried by the plate and engageable with the abutment to provide a positive driving connection between the clutch elements, means for establishing a frictional drive connection between the elements, said means being operative when the plate is in a position maintaining the centrifugally actuated pawl in operative relationship with respect to the abutment, means for shifting the plate to move the pawl out of operative relation with respect to the abutment and release the frictional driving connection, and spring means confined between the plate and the means affording the frictional drive connection to maintain the frictional drive connection until the plate is shifted a distance sufficient to move the pawl out of operative relationship with respect to the abutment.

8. In a clutch mechanism, a pair of cooperating elements rotatable about a common axis and adapted to be drivingly connected, one of said elements being provided with a substantially cylindrical well and the other element being received in said cylindrical well, separable members non-rotatably connected with the inner wall of the cylindrical well and the periphery of the element disposed within the well to afford a frictional driving connection between the elements when in engagement, a plate at the bottom of the well non-rotatably connected with the inner wall of the well and movable axially to engage and disengage the separable members to effect the frictional drive connection, interengaging means carried by the cooperating element within the well and the plate to afford a positive drive connection between the elements, and means for shifting the plate to first disengage the interengaging means and then effect separation of the separable members to disrupt the frictional connection.

9. In a clutch mechanism, a pair of cooperating elements rotatable about a common axis and adapted to be drivingly connected, one of said elements having a substantially cylindrical well and the other element being disposed within said well, a plurality of cooperating discs assembled between the inner wall of the well and the outer periphery of the element therein to afford a frictional driving connection between the elements when engaged with each other under pressure, an axially shiftable plate at one end of the plurality of assembled cooperating discs movable to apply a pressure on the discs, a pawl carrier non-rotatably connected with the inner wall of the well and shiftable axially with said plate, a pawl supported from said carrier and maintained in an active position by centrifugal force, an abutment non-rotatably connected with the element within the well and engageable by the pawl when said plate and carrier are in their positions at which the plate maintains the plurality of discs engaged under pressure, spring means for maintaining the plate and carrier in said position, means operable in opposition to the spring means for shifting the plate away from the plurality of discs to release the pressure on the discs, and a second spring means confined between the plurality of discs and the pawl carrier to maintain the discs engaged under pressure during the degree of movement of the plate and carrier necessary to move the pawl out of operative relationship with the abutment.

HUGO F. SCHMIDT.